United States Patent [19]

Nordskog

[11] Patent Number: 4,949,627
[45] Date of Patent: Aug. 21, 1990

[54] COFFEE MAKER FOR USE IN AIRCRAFT

[76] Inventor: Robert A. Nordskog, 18135 Karen Dr., Tarzana, Calif. 91356

[21] Appl. No.: 321,423

[22] Filed: Mar. 9, 1989

[51] Int. Cl.⁵ .............................................. A47J 31/00
[52] U.S. Cl. ......................................... 99/281; 99/295
[58] Field of Search ................. 99/295, 279, 280, 281, 99/282, 283, 299, 300, 302 R, 304, 305, 306, 307; 426/433

[56] References Cited

U.S. PATENT DOCUMENTS

| | | | |
|---|---|---|---|
| 3,347,151 | 10/1967 | Ronalds | 99/295 |
| 3,443,508 | 5/1969 | Reynolds | 99/295 |
| 4,354,427 | 10/1982 | Filipowicz | 99/295 |
| 4,757,754 | 7/1988 | Welker | 99/307 |

Primary Examiner—Robert W. Jenkins
Attorney, Agent, or Firm—John J. Posta, Jr.

[57] ABSTRACT

A device for brewing coffee in an aircraft is disclosed which operates automatically, and is substantially lighter than and brews coffee faster than conventional aircraft coffee makers known in the art, and offers a high degree of safety in its operation. The aircraft coffee maker uses a heater tube assembly having three heater tubes with heating elements therein which are arranged in sequential order to heat water as it flows through the heater tube assembly. The aircraft coffee maker provides an entirely automatic brew cycle, and uses redundant safety mechanisms to monitor the brew operation to ensure that the brewing operation will be carried out both efficiently and safely.

22 Claims, 5 Drawing Sheets

COFFEE MAKER FOR USE IN AIRCRAFT

BACKGROUND OF THE INVENTION

1. Field of the Invention

The present invention relates generally to a device for brewing coffee, and more particularly to an improved coffee maker specially designed for installation in an aircraft, which coffee maker operates automatically, is substantially lighter, and brews coffee faster than conventional aircraft coffee makers known in the art.

For virtually as long as there has been commercial air travel, stewardesses have been giving passengers complimentary drinks, including coffee and hot tea. In early airplanes, since the flights were relatively short and the cabins were small, it was sufficient to carry on thermoses of brewed coffee, and to merely dispense it during the flight. However, as trips grew in duration, and as the size of aircraft steadily increased, it became increasingly impractical to carry on sufficient hot coffee for a flight.

Thus was born the first coffee maker in an aircraft, which was only somewhat modified from a conventional drip coffee maker. Over the years several modifications have been made in the aircraft coffee brewing system, most of which have been due to safety considerations. The coffee makers are required by FAA regulations to be securely fastened in place in a bay which was originally used to hold a refillable water dispensing tank. The coffee maker bay has a rail mount to which a coffee maker is fastened securely after the coffee maker is slid into the coffee maker bay. This prevents the coffee maker from being thrown from its place during turbulence encountered during a flight.

Another safety requirement is the provision that the coffee pot or server be securely retained in the coffee maker whenever it is placed there. This requirement prevents the server itself, which may be filled with hot coffee, from being thrown from the coffee maker and causing severe burns to the galley crew or even to passengers. It will be recognized at once by those skilled in the art that the mechanism used to retain the server in the coffee maker must be easy to operate, preferably being operable with the same hand used to remove the server from the coffee maker.

An additional difference of aircraft coffee makers over domestic coffee makers is that the aircraft coffee makers are operated at high altitudes with cabin pressures substantially below sea level air pressure. This results in water having a substantially lower boiling point, typically less than 200 degrees Fahrenheit. As such, aircraft coffee makers must be designed to heat water to a point below the typical coffee maker temperature of 205 degrees Fahrenheit, plus or minus five degrees.

Another requirement of the aircraft coffee maker is that it operate on the electrical voltage available in the aircraft. Most aircraft use 208 Volt 400 Hertz three phase power, with only a limited amount of 110 Volt power being available (typically for uses such as to power electric shavers in the aircraft lavatories). It will at once be realized by those skilled in the art that a coffee maker requires substantial wattage when brewing coffee. Even so, most available aircraft coffee makers operate only on single phase power, making them inconvenient to say the least. It is accordingly an objective of the present invention that it operate on 208 Volt 400 Hertz three phase power for brewing coffee.

The disadvantages inherent in existing aircraft coffee makers are best illustrated through a description of their typical brewing cycle. A fill valve is opened to fill the brewing tank with water (just as a conventional domestic coffee maker must be filled with water). This is typically a manual operation which must be supervised by the galley crew. In many aircraft coffee makers, there is also a manual vent valve which must be opened to vent the brewing tank. After filling the brewing tank, the fill valve is turned off and the vent valve is closed.

The coffee maker is turned on, and the water begins to heat. While some of the coffee makers will send the heated water to a brew nozzle over a tray containing the coffee, which is located over the server, others have a hot water valve which may be used to divert the hot water to the side through a nozzle. This hot water valve diverts water to the nozzle for use in making hot tea. It may thus be seen that conventional aircraft coffee makers have a brewing tank, and as many as many as three manually actuated valves.

This makes the coffee brewing operation an excessively manual operation which requires a substantial amount of galley crew time. It is a primary objective of the present invention to automate the coffee brewing process to the maximum extent possible. It is also an objective of the present invention to eliminate as much weight in the coffee maker as possible. This will result in valuable fuel savings, since each additional pound of equipment carried presently costs as much as $350 per year in additional fuel burned.

A conventional aircraft coffee maker such as those presently known in the art requires approximately seven to seven and one-half minutes to brew a 34-36 ounce server of coffee. This is greater than one minute per cup to brew the coffee, and is unacceptable since it frequently results in delays in serving passengers. Accordingly, it is an additional objective of the present invention to speed up the brewing process as much as possible. Since most of the time required in the brewing process is the time required to heat the water, it is thus an objective of the present invention to heat the water substantially faster than is done in existing aircraft coffee maker designs.

An additional problem which may occur with existing aircraft coffee makers is damaging them by operating them without water in the brewing tank. In the case of those which have a thermostat, if the thermostat fails the coffee maker will overheat, damaging the coffee maker. Another potential problem occurring with a failed thermostat is the potential of overheating the water beyond the lowered boiling point mentioned above. The potential for a bursting brewing tank is possible, which could cause both steam burns of the galley crew and discomfort to the passengers. It is therefore a first additional objective of the present invention to provide backup safety monitoring of a possible overheating situation, and a second additional objective to provide an alternate flow path for heated water in the event of a high pressure situation occurring for any reason.

It is thus a further objective of the present invention to provide an enhanced aircraft coffee maker having all of the above advantages and objectives which is easy to operate and which will be desirable to galley crew personnel. A final objective is that the improved aircraft coffee maker of the present invention be as easy and inexpensive to manufacture as possible, thereby giving it an economic advantage in marketing it against competing designs. Finally, it is desirable that the present invention provide all of the aforesaid advantages and objectives without resulting in any significant disadvantage.

SUMMARY OF THE INVENTION

The disadvantages and limitations of the background art discussed above are overcome by the present invention. With this invention, an improved aircraft coffee maker is disclosed which solves the problems of the art. The aircraft coffee maker of the present invention is designed fit in the standard coffee maker bay, and to be fastened to either of the standard rail mounts located in the coffee maker bay. The aircraft coffee maker of the present invention is made of a two-piece molded high impact housing rather than a number of machined metal housing segments, as are known aircraft coffee makers. This has the twin benefits of reducing both cost and weight of the aircraft coffee maker of the present invention.

In addition, the brewing tank is completely eliminated in the aircraft coffee maker of the present invention. Instead of a heated brewing tank, the aircraft coffee maker of the present invention uses a heater tube assembly through which water is passed in order to heat it. This elimination of the brewing tank also aids in the objective of the present invention to eliminate as much weight in the coffee maker as possible. In fact, the aircraft coffee maker of the present invention is approximately four pounds lighter than known aircraft coffee makers. This results in substantial and valuable fuel savings over the life of the coffee maker, since each additional pound of equipment carried presently costs as much as $350 per year in additional fuel burned.

The aircraft coffee maker of the present invention has in its heater tube assembly three heating elements which are connected in a wye configuration (although a delta configuration could also be used). It may thus be appreciated that the heater tube assembly of the present invention operates on the standard 208 Volt 400 Hertz three phase power most aircraft today use. The aircraft coffee maker of the present invention heats water to approximately 193 degrees Fahrenheit, which is below the typical homw coffee maker temperature. The actual water volume of the heater tube assembly is quite small, so that the water is actually heated as it passes through the heater tube assembly.

This heater tube assembly design also presents the advantage of speeding up the brewing process considerably. Since the water is passed in a steady stream from a standard holding tank external of the aircraft coffee maker through the heater tube assembly to heat the water, the aircraft coffee maker of the present invention thus heats the water substantially faster than is possible in existing aircraft coffee maker designs. It takes approximately half the time to brew a larger server of coffee with the aircraft coffee maker of the present invention.

As stated above, it is a primary objective of the present invention to automate the coffee brewing process to the maximum extent possible. This is accomplished by an automated brewing cycle which requires but a single button to be pushed to perform the entire cycle. The aircraft coffee maker of the present invention will then automatically brew a full server of coffee (or heat a server of hot water if coffee grounds are not placed in the brew tray). It will be appreciated that the enhanced aircraft coffee maker of the present invention is extremely easy to operate, and thus which will be highly desirable to galley crew personnel.

The automatic brewing cycle is accomplished using only a single valve, which is a hot water valve allowing water to flow from the heating tube assembly to the brew nozzle. As such, as many as two valves are eliminated from existing aircraft coffee makers. In addition, like the rest of the cycle, the operation of the single hot water valve is automatic, unlike the manual valve actuation of up to three valves which was required by existing coffee makers.

It will thus be appreciated that the brewing process requires only that coffee and a filter be placed in the brew tray, that the brew tray and the server be placed in the aircraft coffee maker, and that the aircraft coffee maker be turned on to brew a larger server of coffee in less than half the time of previously known aircraft coffee makers. As such, the brewing process is quick, simple, and highly convenient. The mechanism used to retain the server in the coffee maker of the present invention is also easy to operate, and is operable with the same hand used to remove the server from the coffee maker.

The aircraft coffee maker of the present invention is also a highly safe apparatus, since it contains both a water level sensor and a temperature sensor. It also contains a backup safety system to monitor a possible overheating situation, with a second temperature sensor being used to provide a shutoff if the first temperature sensor should fail. In addition, the aircraft coffee maker of the present invention contains a relief valve to provide an alternate or bypass flow path for heated water in the event of a high pressure situation occurring for any reason. It will therefore be appreciated that in addition to being easy to operate, the aircraft coffee maker of the present invention is a very safe system.

It will thus be appreciated that the aircraft coffee maker of the present invention fits in the standard coffee maker bay, and has a mechanism used to retain the server in the coffee maker which is easy to operate. It operates on standard aircraft power, and automates the coffee brewing process to the maximum extent possible. The aircraft coffee maker of the present invention eliminates approximately four pounds, resulting in substantial and valuable fuel savings.

The aircraft coffee maker of the present invention also speeds up the brewing process substantially, requiring only half the time to brew a larger pot than previously known aircraft coffee makers. It also provides backup safety monitoring of a possible overheating situation, provides an alternate flow path for heated water in the event of a high pressure situation occurring for any reason. It will be appreciated by those skilled in the art that the enhanced aircraft coffee maker of the present invention is easy to operate, and which will be very desirable to galley crew personnel. It is also easy and inexpensive to manufacture, thereby giving it an economic advantage against competing designs. Finally, the present invention provides all of the aforesaid advantages and objectives without resulting in any significant disadvantage.

DESCRIPTION OF THE DRAWINGS

These and other advantages of the present invention are best understood with reference to the drawings, in which.

DETAILED DESCRIPTION OF THE PREFERRED EMBODIMENT

Figure 1:
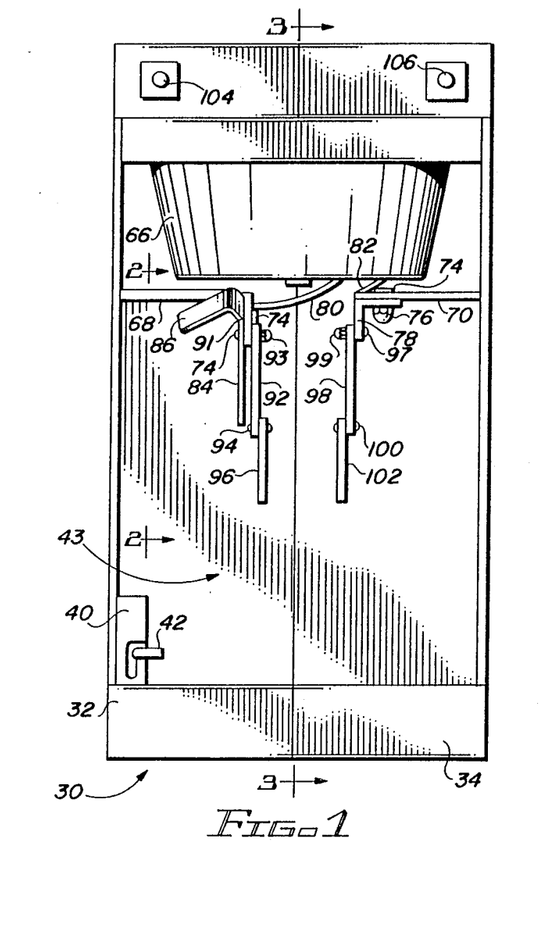
FIG. 1 is a front plan view of the aircraft coffee maker of the present invention with the server removed to clearly show the electrodes used to indicate that the server is full.
Figures 2, 3:
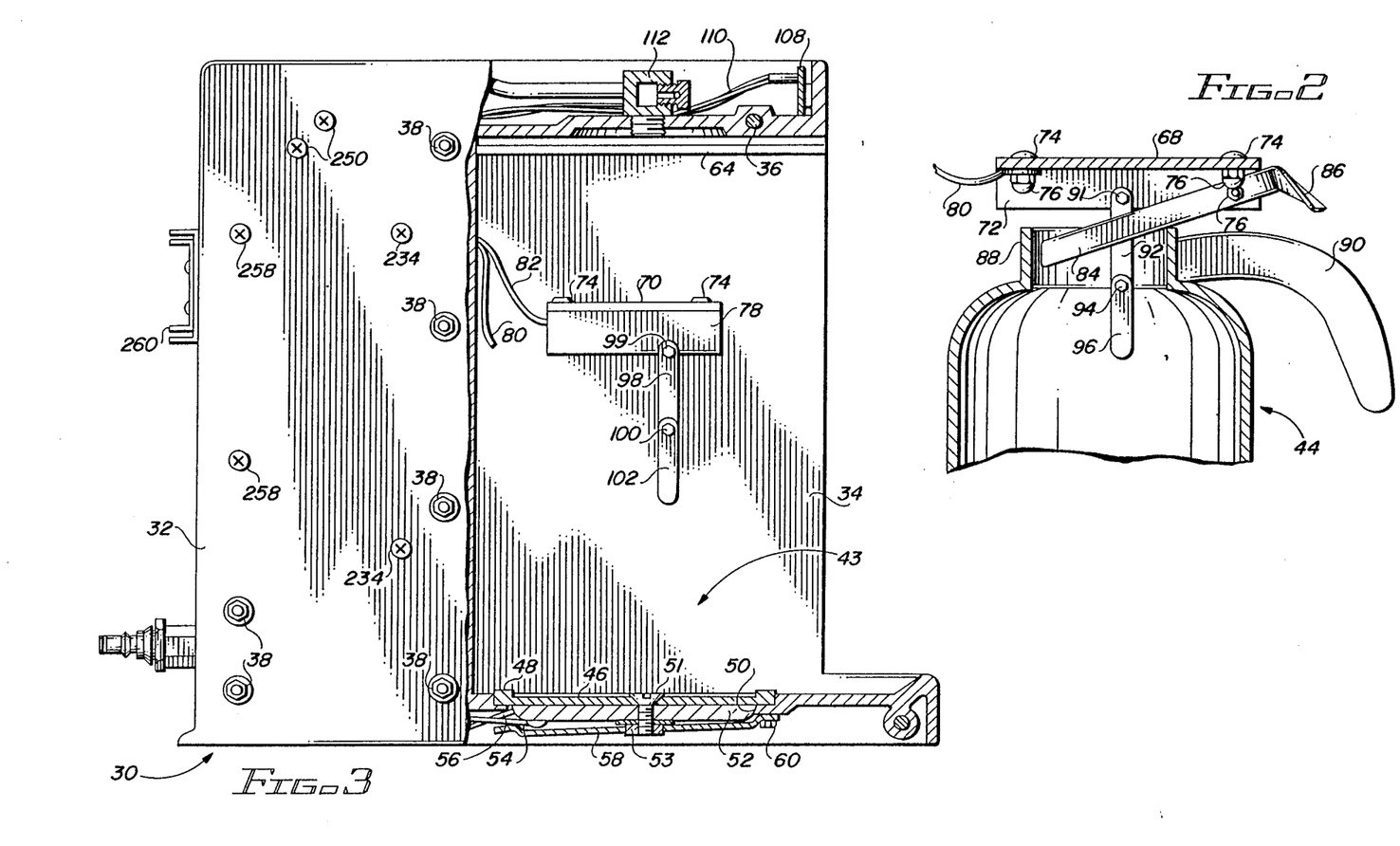
FIG. 2 is a cutaway view showing the server and the mechanism used to lock the server in place in the aircraft coffee maker of FIG. 1.
FIG. 3 is a side view of the aircraft coffee maker shown in FIG. 1, with the aircraft coffee maker partially cut away to show the brew nozzle and the heater used to keep coffee in the server hot.

The preferred embodiment of the present invention is an aircraft coffee maker 30 which is shown in FIG. 1. The aircraft coffee maker 30 has a housing made of a left housing half 32 and a right housing half 34, which are fastened together with a plurality of bolts 36 and nuts 38 (FIG. 3). In the preferred embodiment, the left and right housing halves 32 and 34 are molded of high impact material. This differs from conventional assembly of an aircraft coffee maker, which uses a number of machined metal housing segments which are welded or otherwise fastened together. This construction has the twin benefits of reducing both the cost and the weight of the aircraft coffee maker 30 of the present invention.

The aircraft coffee maker 30 of the present invention is designed to fit in a standard coffee maker bay of an aircraft (not shown), and thus the size and basic configuration of the left and right housing halves 32 and 34 are dictated by the size of a standard coffee maker bay. The aircraft coffee maker 30 is designed to be fastened to either of the types of standard rail mount (not shown) which are located in a standard coffee maker bay. A latch housing 40 is located in the left housing half 32 as shown in FIG. 1, with a spring-loaded T-bolt 42 being slideably mounted in the latch housing 40.

The spring-loaded T-bolt 42 is biased in a downward direction by a spring (not shown) located in the upper portion of the latch housing 40. When the spring-loaded T-bolt 42 is in its downward position, it protrudes from the bottom of the left housing half 32. In the downward position, the protruding portion of the spring-loaded T-bolt 42 will lock the aircraft coffee maker 30 in place in a standard coffee maker bay (not shown) by engaging an aperture in a standard rail mount (not shown) in the standard coffee maker bay.

Referring now to FIG. 3, the left and right housing halves 32 and 34 define at the front thereof a bay, indicated generally by the reference numeral 43, for receiving a server 44 (FIG. 2). Located in the bay 43 at the bottom thereof is a circular warming plate 46 having a raised lip 48 around the edge thereof. The raised lip 48 of the circular warming plate 46 fits into a circular recessed aperture 50 in the left and right housing halves 32 and 34.

Located under the circular warming plate 46 is a circular heating element 52, which is spaced away from the circular recessed aperture 50 so as not to touch the material of the left and right housing halves 32 and 34. The circular heating element 52, which is preferably a wire heating element encased in a ceramic material, is attached to the circular warming plate 46 by a bolt 51 and a nut 53. Wires 54 are used to supply power to the circular heating element 52, and a thermocouple 56 is used to detect the temperature of the circular heating element 52. A protective cover 58 is placed underneath the circular heating element 52, and is retained by a plurality of screws 60.

The thermocouple 56 is used to maintain the temperature of the circular heating element 52 at a preferred setting. When the thermocouple 56 indicates that the circular heating element 52 has reached its appropriate temperature, power supplied through the wires 54 to the circular heating element 52 is turned off. Similarly, when the thermocouple 56 indicated that the temperature of the circular heating element 52 has dropped by a predetermined amount, power is once again supplied through the wires 54 to the circular heating element 52. This aspect of the aircraft coffee maker 30 is conventional, and is well known in the art.

Referring now to FIGS. 1 and 3, located near the top of the bay 43 in the left and right housing halves 32 and 34 are a pair of tabs 62 (not shown) and 64, which are molded as a part of the left and right housing halves 32 and 34, respectively, and are used to support a brew tray 66. The tab 62 is located on the inside of the left side wall of the left housing half 32 near the top of the bay 43. The tab 64 is located on the inside of the right side wall of the right housing half 34 near the top of the bay 43 (FIG. 3). The brew tray 66 is installed in the top of the bay 43 by sliding it in on the tabs 62 and 64, as is conventional in the art. The design of the brew tray 66 is also as conventional in the art.

Referring now again to FIG. 1, located in the bay 43 slightly below the brew tray 66 when it is installed are left and right horizontal plates 68 and 70, which are molded as a part of the left and right housing halves 32 and 34, respectively. The left horizontal plate 68 extends from the inside of the left side wall of the left housing half 32 approximately one-third of the way toward the right side wall of the right housing half 34. The right horizontal plate 70 extends from the inside of the right side wall of the right housing half 34 approximately one-third of the way toward the left side wall of the left housing half 32.

A segment of right angle material 72 is attached to the right-most edge of the left horizontal plate 68 by two bolts 74 and two nuts 76, as shown in FIGS. 1 and 2. Similarly, a segment of right angle material 78 is attached to the left-most edge of the right horizontal plate 70 by two bolts 74 and two nuts 76, as shown in FIGS. 1 and 3. Referring to FIG. 2, a wire 80 is attached at one end to the segment of right angle material 72 by one of the bolts 74 and the nuts 76. Referring to FIG. 3, a wire 82 is similarly attached at one end to the segment of right angle material 78 by one of the bolts 74 and the nuts 76.

Referring now to FIGS. 1 and 2, an arm 84 is moveably mounted onto the segment of right angle material 72 near the front thereof with a loosely connected bolt 74 and a nut 76. The arm 84 extends toward the back of the bay 43 of the aircraft coffee maker 30, at a downward angle as shown best in FIG. 2. At the front of the arm 84 a trigger portion 86 is located which may be pressed downwardly to raise the arm 84 to a horizontal position. This mechanism is used to retain the server 44 in the coffee maker 30 of the present invention.

When the server 44 is removed from the bay 43 in the aircraft coffee maker 30, it may be replaced by merely pushing it into the bay 43 using a handle 90 on the server 44. The neck 88 of the server 44 pushes the arm 84 upward and out of the way as the server 44 is placed in the bay 43. When the server 44 is fully in the bay 43 in place on the circular warming plate 46 (FIG. 3), the arm 84 drops down into the neck 88 of the server 44, as shown in FIG. 2. To remove the server 44 from the bay 43, the trigger portion 86 of the arm 84 is pressed to raise the arm 84 out of the neck 88 of the server 44, thereby allowing the server 44 to be removed from the bay 43. It will be appreciated that this mechanism is easy to operate with the thumb of the same hand used to grasp the handle 90 of the server 44 to remove the server 44 from the aircraft coffee maker 30.

As best shown in FIGS. 1 and 2, there are a pair of electrodes suspended from the left and right horizontal plates 68 and 70. It will first be appreciated that the left and right housing halves 32 and 34 are made of a nonconductive substance, allowing them to suspend in insulated fashion the segments of right angle material 72 and 78, respectively, which are connected to the wires 80 and 82, respectively.

Suspended from the segment of right angle material 72 by a bolt 91 and nut 93 in swingably moveable fashion is a left upper electrode 92. Suspended in turn from the bottom of the left upper electrode 92 by a pin 94 also in swingably moveable fashion is a left lower electrode 96. Similarly, suspended from the segment of right angle material 78 by a bolt 97 and nut 99 in swingably moveable fashion is a right upper electrode 98. In addition, suspended in turn from the bottom of the right upper electrode 98 by a pin 100 also in swingably moveable fashion is a right lower electrode 102.

It will be appreciated that the left upper electrode 92, the left lower electrode 96, the right upper electrode 98, and the right lower electrode 102 are all made of a conductive material. Similarly, the bolts 91 and 97 and the pins 94 and 100 are made of a conductive material. In addition, the left and right upper electrodes 92 and 98 are free to swing from the segments of right angle material 72 and 78, respectively. In identical fashion, the left and right lower electrodes 96 and 102 are free to swing from the left and right upper electrodes 92 and 98, respectively.

The left lower electrode 96 is thus electrically connected to the wire 80, and the right lower electrode 102 is electrically connected to the wire 82. As shown in FIG. 2, when the server 44 is fully inserted into the bay 43, the left lower electrode 96 and the right lower electrode 102 (not shown in FIG. 2) will dangle through the neck 88 of the server 44 into the interior of the server 44, where they will contact coffee or hot water in the server 44 when the server 44 is full. The relative lengths of the left and right upper electrodes 92 and 98 and the left and right lower electrodes 96 and 102 must be of a length sufficiently short to cause them to fall into the neck 88 of the server 44 when the server 44 is inserted into the bay 43, yet sufficiently long to allow the left and right lower electrodes 96 and 102 to contact coffee of hot water in the server 44 when the server 44 is full.

The coffee or hot water in the server 44 will thus act to make the circuit between the left lower electrode 96 and the right lower electrode 102 when the server 44 is full, thereby providing an indication that the server 44 is full. The aircraft coffee maker 30 of the present invention may thus be made to automatically brew a full server 44 of coffee (or heat a full server 44 of hot water if coffee grounds are not placed in the brew tray 66) by continuing to send water to the brew tray 66 until the left and right lower electrodes 96 and 102 indicate that the server 44 is full. In practice, the left and right lower electrodes 96 and 102 should be located sufficiently low to make electrical contact with coffee or hot water in the server 44 when there is still some room left in the server 44, thereby allowing the supply of hot water to be shut off and any coffee grounds in the brew tray 66 to drain completely.

Referring now to FIGS. 1 and 3, located at the top of the front of the left housing half 32 near the left side of the aircraft coffee maker 30 is a power switch 104. In the preferred embodiment, the power switch 104 is a membrane switch having a light therein which is turned on when the power switch 104 is pressed to turn power to the aircraft coffee maker 30 on. When the power switch 104 is pressed again to turn power to the aircraft coffee maker 30 off, the light in the power switch 104 will go off.

Located near the top of the front of the right housing half 34 near the right side of the aircraft coffee maker 30 is a brew switch 106. Like the poWer switch 104, the brew switch 106 is a membrane switch having a light therein which is turned on when the brew switch 106 is pressed to begin the brew cycle. When the brew cycle is completed, the light in the brew switch 106 will go off.

In the preferred embodiment, the power switch 104 and the brew switch 106, and the lights associated within them, are mounted on a printed circuit board 108. The printed circuit board 108 is mounted behind the top of the left and right housing halves 32 and 34. Wires 110 lead from the printed circuit board 108, as shown in FIG. 3. A cover (not shown) may be placed over the printed circuit board 108 to protect it.

Figure 4:
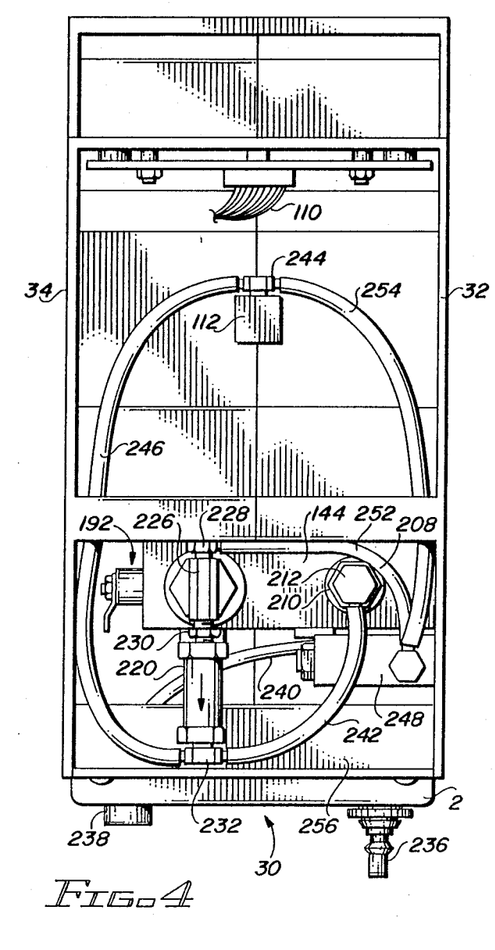
FIG. 4 is a top plan view of the aircraft coffee maker shown in FIGS. 1 and 3, showing the heater tube assembly and the plumbing between the various components.

Referring now to FIGS. 3 and 4, the location of a brew nozzle 112 used to spray hot water onto coffee (not shown) in the brew tray 66 (FIG. 1) is shown. The brew nozzle 112 is mounted near the top of the left and right housing halves 32 and 34 directly over the center of the brew tray 66. As such, the brew nozzle 112 will spray hot water into the top of the bay 43.

Figure 5:
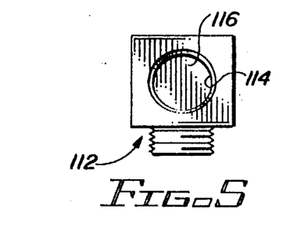
FIG. 5 is a front plan view of the brew nozzle shown in FIG. 3.
Figure 6:
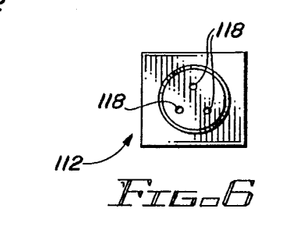
FIG. 6 is a bottom plan view of the brew nozzle shown in FIG. 5.
Figure 7:
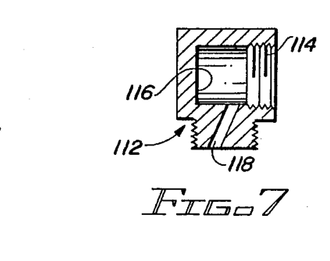
FIG. 7 is a cutaway view of the brew nozzle shown in FIGS. 5 and 6, showing one of the spray channels.

Referring now to FIGS. 5 through 7, the brew nozzle 112 has a threaded aperture 114 in the front thereof through which hot water will be supplied to the brew nozzle 112. Located inside the brew nozzle 112 in a small chamber 116. Leading from the small chamber 116 in the brew nozzle 112 to the bottom of the brew nozzle 112 are three spray channels 118. The three spray channels 118 provide the path for fluid communication from the small chamber 116 in the brew nozzle 112 to coffee (not shown) in the brew tray 66 (FIG. 1).

The three spray channels 118 lead from a common centrally located origin radially outwardly at an angle approximately ten degrees from vertical. Also, the three spray channels 118 are radially 120 degrees apart. It will be realized by those skilled in the art that there could be more or less than the three spray channels 118, and that the angle from vertical or the radial dispersal of the spray channels 118 could vary. The purpose of the configuration shown as an example of the preferred embodiment is to spray hot water onto the coffee grounds throughout the brew tray 66, rather than just in the center thereof.

Figures 8, 9, 10, 14:
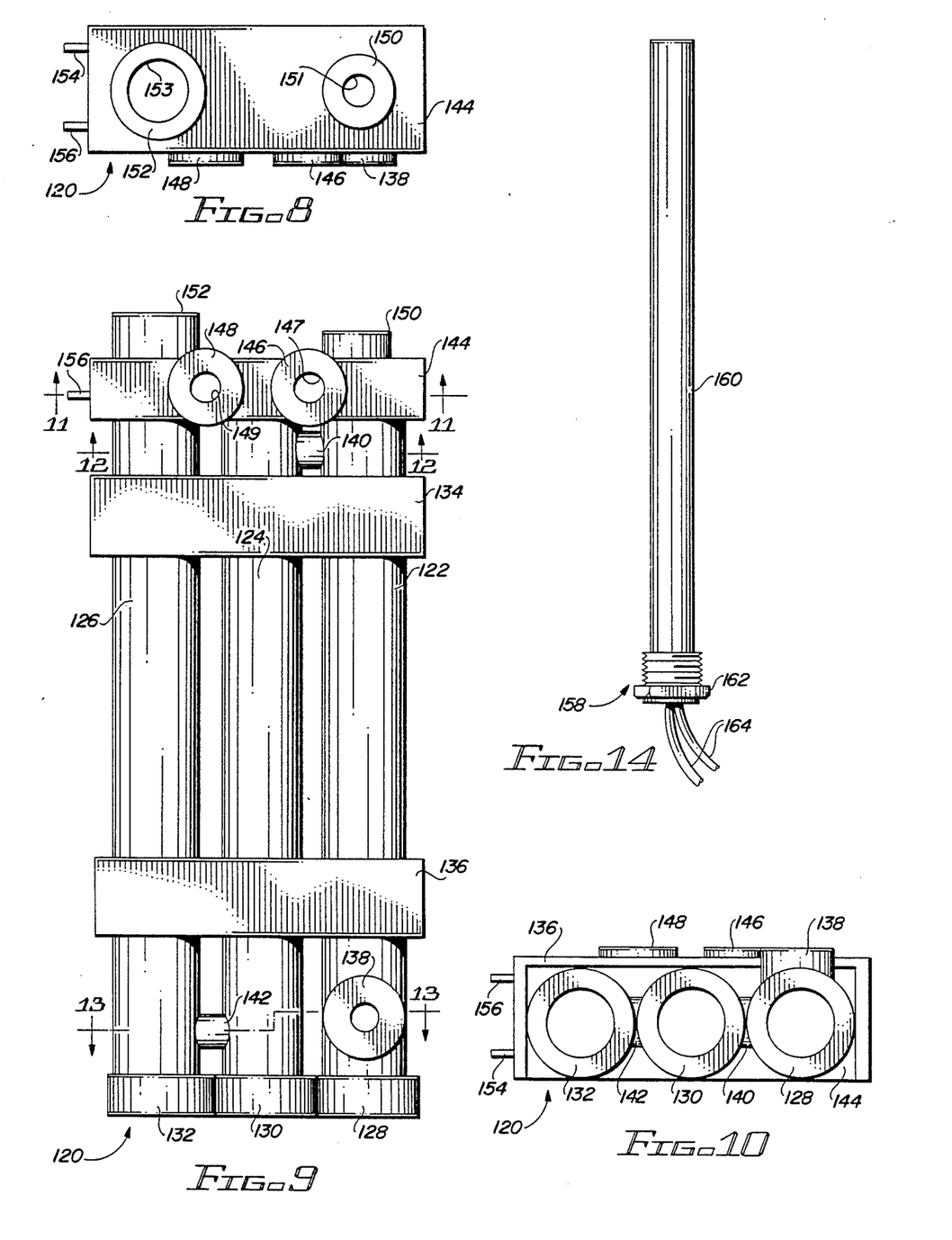
FIG. 8 is a top plan view of the heater tube assembly shown in FIG. 4, showing the top of the heater tube assembly manifold.
FIG. 9 is a back plan view of the heater tube assembly shown in FIG. 8, showing the flow channels between adjacent heater tubes.
FIG. 10 is a bottom plan view of the heater tube assembly shown in FIGS. 8 and 9.
FIG. 14 is a plan view of one of the heating elements which are located in each of the heater tubes.
Figure 11:
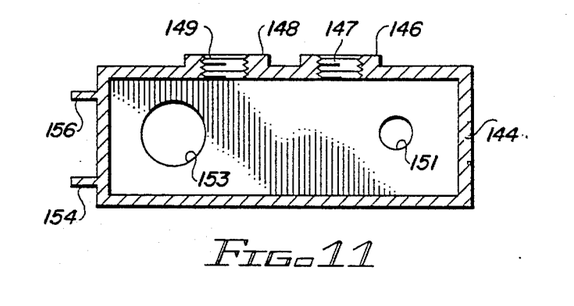
FIG. 11 is a first cutaway view of the heater tube assembly shown in FIGS. 8 through 10, showing the interior of the heater tube assembly manifold.
Figure 12:
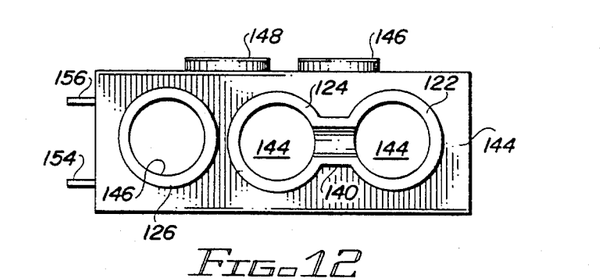
FIG. 12 is a second cutaway view of the heater tube assembly shown in FIGS. 8 through 10, showing the flow channel between the first and second heater tubes, and the aperture between the third heater tube and the heater tube assembly manifold.

It is most noteworthy of the aircraft coffee maker 30 of the present invention that it completely eliminates the brewing tank. Instead of a heated brewing tank, the aircraft coffee maker 30 of the present invention uses a heater tube assembly 120, shown in FIGS. 8 through 13, through which water is passed in order to heat it. The heater tube assembly will be described as it is installed in the aircraft coffee maker 30; thus, the view shown in FIG. 9 is of the back side of the heater tube assembly 120.

The heater tube assembly 120 uses three heater tubes 122, 124, and 126. The first heater tube 122 will be the one located nearest the left side of the aircraft coffee maker 30 (FIG. 4) when the heater tube assembly 120 is installed in the left and right housing halves 32 and 34. The second heater tube 124 is mounted in the heater tube assembly 120 next to the first heater tube 122. The third heater tube 126 will be the one located nearest the right side of the aircraft coffee maker 30 (FIG. 4) when the heater tube assembly 120 is installed.

The three heater tubes 122, 124, and 126 are essentially cylindrical, and in the example used herein are approximately eight inches long and one inch in outside diameter. At the bottom of each of the three heater tubes 122, 124, and 126, cylindrical bosses 128, 130, and 132, respectively are mounted. In the preferred embodiment, the heater tube assembly 120 is assembled by watertight welding throughout.

The three cylindrical bosses 128, 130, and 132 are in fluid communication with the interiors of the three heater tubes 122, 124, and 126, respectively. The three cylindrical bosses 128, 130, and 132 are welded together in side-by-side fashion at the bottom of the heater tube assembly 120. Each of the three cylindrical bosses 128, 130, and 132 is threaded on the inside to accept the heater cores, as will become evident below. Located at two points on the three heater tubes 122, 124, and 126 are two brackets 134 and 136. The brackets 134 and 136 are both U-shaped, with the arms of the U's extending toward the front of the aircraft coffee maker 30 (FIG. 4).

The bracket 134 is located approximately one-quarter of the way down from the top of the heater tube assembly 120, and the bracket 136 is located approximately one-quarter of the way up from the bottom of the heater tube assembly 120. The brackets 134 and 136 are welded onto the three heater tubes 122, 124, and 126 to provide support for the three heater tubes 122, 124, and 126, and to provide a means of mounting the heater tube assembly 120 to the left side of the left housing half 32 (FIG. 4) in the aircraft coffee maker 30.

Figure 13:
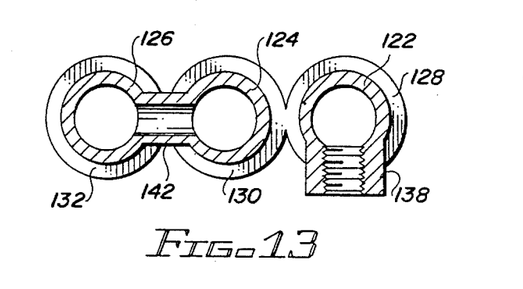
FIG. 13 is a third cutaway view of the heater tube assembly shown in FIGS. 8 through 10, showing the flow channel between the second and the third heater tubes.

Located on the back side of the first heater tube 122 and near the bottom thereof is a boss 138, best shown in FIGS. 9 and 13. The boss 138 is threaded on the interior thereof, and is in fluid communication with the interior of the first heater tube 122. Located near the tops of the first heater tube 122 and the second heater tube 124 is a connection tube 140, best shown in FIGS. 9 and 12. The connection tube 140 provides a means of fluid communication between the first heater tube 122 and the second heater tube 124. The connection tube 140 is welded to the first heater tube 122 and to the second heater tube 124.

Located near the bottoms of the second heater tube 124 and the third heater tube 126 is a connection tube 142, best shown in FIGS. 9 and 13. The connection tube 142 provides a means of fluid communication between the second heater tube 124 and the third heater tube 126. The connection tube 142 is welded to the second heater tube 124 and to the third heater tube 126. It will thus be recognized that the three heater tubes 122, 124, and 126 are in sequential fluid communication.

Located at the tops of the three heater tubes 122, 124, and 126 is an essentially box-like manifold 144, which is welded to the tops of the three heater tubes 122, 124, and 126. Located on the bottom of the manifold 144 is a single aperture 146 (FIG. 12), which allows fluid communication between the interior of the manifold 144 and the third heater tube 126. Thus, the top ends of the first heater tube 122 and the second heater tube 124 do not communicate with the interior of the manifold 144.

Located on the back side of the manifold 144, as best shown in FIG. 9, are two bosses 146 and 148, which are both welded to the manifold 144. The bosses 146 and 148 are both threaded on the interior thereof, and are both in fluid communication with the interior of the manifold 144. The boss 146 is in fluid communication with the manifold 144 through an aperture 147 in the manifold 144. Likewise, the boss 148 is in fluid communication with the manifold 144 through an aperture 149 in the manifold 144. The boss 146 is located roughly between the top end of the first heater tube 122 and the top end of the second heater tube 124. The boss 148 is located roughly between the top end of the second heater tube 124 and the top end of the third heater tube 126.

Located on the top side of the manifold 144 is a boss 150, best shown in FIG. 8, which is welded to the manifold 144. The boss 150 is threaded on the interior thereof, and is in fluid communication with the interior of the manifold 144 through an aperture 151. The boss 150 is located roughly above the top of the first heater tube 122. Also located on the top side of the manifold 144 is a large boss 152, best shown in FIG. 8, which is welded to the manifold 144. The large boss 152 is threaded on the interior thereof, and is in fluid communication with the interior of the manifold 144 through an aperture 153. The large boss 152 is located roughly above the top of the third heater tube 126.

Located on the right side of the manifold 144 are two pins 154 and 156, which will be used to mount a sensor described below. This completes the description of the heater tube assembly 120. referring now to FIG. 14, a heating element 158 is shown. The heating element 158 include a heating rod 160, a threaded, sealing end cap 162, and wires 164 extending from the threaded, sealing end cap 162. The heating rod 160 is approximately eight inches long in the preferred embodiment, and is typically a standard heater such as a Calrod heating rod.

In the preferred embodiment, three of the heating elements 158 are used, with each being approximately 900 Watts. If the heating elements 158 are to be connected in wye, as in the preferred embodiment, they will have half of the 208 Volts (the standard power in most aircraft today is 208 Volt 400 Hertz three phase power) across them. If they are to be connected in Delta, they will each have the full 208 Volts across them, and they must be sized accordingly. In any event, one heating element 158 is inserted into the bottom of each of the three heater tubes 122, 124, and 126. The threaded, sealing end caps 162 on the heating elements 158 are turned into the threads on the interior of the three cylindrical bosses 128, 130, and 132 to seal the three heater tubes 122, 124, and 126 on the bottom thereof.

The elimination of the brewing tank by using the heater tube assembly 120 aids in eliminate the weight of the brewing tank from the aircraft coffee maker 30. Between this and the use of lightweight material in the left and right housing halves 32 and 34, the aircraft coffee maker 30 of the present invention is approximately four pounds lighter than known aircraft coffee makers. This results in substantial fuel savings over the life of the coffee maker.

Figure 15:
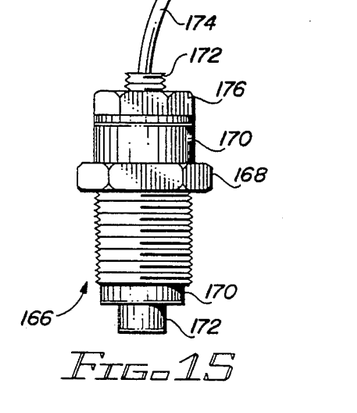
FIG. 15 is a plan view of a thermocouple which is the first temperature sensor.

Referring now to FIG. 15, a thermocouple 166 which is the first temperature sensor is illustrated. The thermocouple 166 essentially consists of a fitting 168, an insulator 170, a thermocouple element 172 terminating at one end in a wire 174, and a nut 176 used to assemble the thermocouple 166. The fitting 168 of the thermocouple 166 screws into the boss 148 in the manifold 144 (FIG. 9). The construction and operation of the thermocouple 166 is well known in the art.

The thermocouple 166 is used to control the temperature in the heater tube assembly 120 (FIG. 9) during the brew cycle. When the temperature measured by the thermocouple 166 exceeds the desired setting, the heating elements 158 in the heater tube assembly 120 will be turned off. When the temperature measured by the thermocouple 166 drops below the desired temperature, the heating elements 158 in the heater tube assembly 120 will be turned on again. In the preferred embodiment, the desired temperature is 193 degrees Fahrenheit, plus or minus three degrees. This lower temperature is necessary due to the lower pressure in an aircraft at cruising altitude, since water under lower pressure boils at a much lower temperature.

Figure 16:
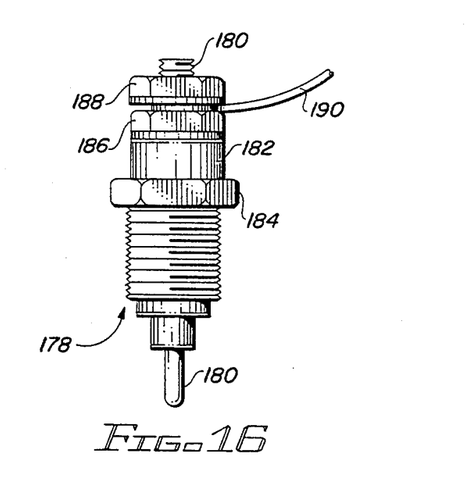
FIG. 16 is a plan view of the water level sensor.

Referring next to FIG. 16, a water level sensor 178 is illustrated. The water level sensor 178 operates using water in the heater tube assembly 120 (FIG. 9) to make a connection between a sensor element 180 mounted using an insulator 182 in a fitting 184 and the fitting 184 itself. A nut 186 is used to assemble the water level sensor 178, and a second nut 188 is used to connect a wire 190 onto sensor element 180. The fitting 184 of the water level sensor 178 screws into the boss 146 in the manifold 144 (FIG. 9).

The water level sensor 178 operates as a shutoff switch to automatically shut down the heating elements 158 in the heater tube assembly 120 if no water is sensed in the manifold 144. Under normal circumstances, water should always be in the heater tube assembly 120. The water level sensor 178 will thus only act as a safety device, to prevent the heater tube assembly 120 from being heated in a dry state, thereby preventing the heating elements 158 from being operated dry and burned out.

Figure 17:
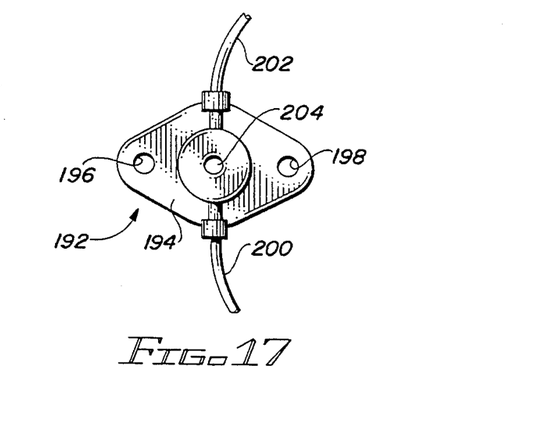
FIG. 17 is a plan view of a thermocouple which is the second temperature sensor.

Referring now to FIG. 17 a thermocouple 192 which is the second temperature sensor is illustrated. The thermocouple 192 has a housing 194 having two apertures 196 and 198 therein. Two wires 200 and 202 lead from a thermocouple element 204 located in the thermocouple 192 and receiving heat transmitted from the housing 194. The construction and operation of the thermocouple 192 is also well known in the art. The aperture 196 fits over the pin 154 on the manifold 144 (FIG. 9), and the aperture 198 fits over the pin 156 on the manifold 144. Nuts or other means (not shown) may be used to retain the thermocouple 192 on the side of the manifold 144.

The thermocouple 192 is a backup safety system which operates only in the event that the thermocouple 166, which is the first temperature sensor, should fail. Accordingly, the temperature level in the heater tube assembly 120 which the thermocouple 192 will use to cause the heating element 158 to be shut down is somewhat higher that the temperature level used by the thermocouple 166 to shut down the system. For example, the thermocouple 192 could use a temperature level of approximately 200 degrees Fahrenheit as the temperature at which it will operate as a redundant system and cause the heating element 158 in the heater tube assembly 120 to be shut down.

Figure 18:
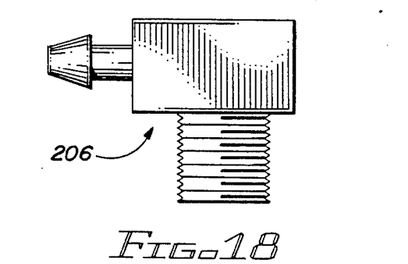
FIG. 18 is a plan view of a fitting used to supply water to the heater tube assembly shown in FIGS. 8 through 10.

Referring next to FIG. 18, an angle fitting 206 used to supply water to the heater tube assembly 120 is shown. The angle fitting 206 is a standard fitting having a male end and a flared connector for attachment to a segment of tubing (not shown) with fluid communication therebetween, and has its male end screwed into the boss 138 (FIG. 9) in the heater tube assembly 120.

Figure 19:
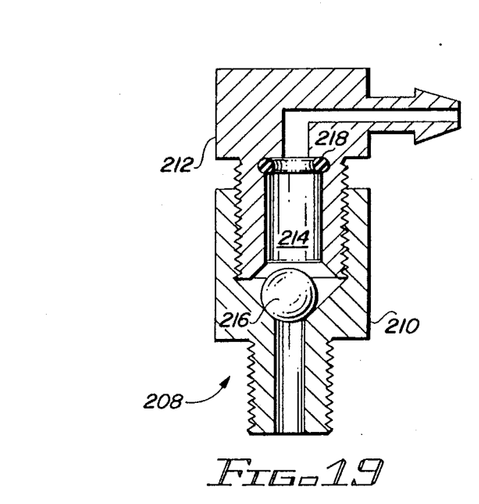
FIG. 19 is a plan view of the air vent valve used to automatically vent air from the heater tube assembly through the heater tube assembly manifold.

Referring now to FIG. 19, an air vent valve 208 used to automatically vent air from the heater tube assembly 120 through the manifold 144 is shown. A fitting 210 having a male end and a female end with fluid communication therebetween is screwed by its female end into the boss 150 (FIG. 9) on the manifold 144. A fitting 212 having a male end and a flared connector for attachment to a segment of tubing (not shown) with fluid communication therebetween has its male end screwed into the female end of the fitting 210.

The interior of the male end of the fitting 212 and the interior of the female end of the fitting 210 together define a chamber 214 in which a Teflon ball 216 is located. An O-ring 218 is located at the top of the chamber 214 in the fitting 212. When air under pressure is supplied to the male end of the fitting 210 from the manifold 144 (FIG. 9), the Teflon ball 216 will move, but will remain near the bottom of the chamber 214, allowing air to pass through the air vent valve 208.

However, should water be supplied to the male end of the fitting 210 from the manifold 144, the Teflon ball 216 will float on the water, and will rise to the top of the chamber 214, coming into contact with the O-ring 218, and forming a seal blocking flow of water through the air vent valve 208. Thus, it may be seen that the air vent valve 208 acts as an automatic air vent valve, allowing air to be vented from the heater tube assembly 120 until the heater tube assembly 120 is filled with water, at which time the air vent valve 208 closes to prevent the passage of water therethrough.

Figure 20:
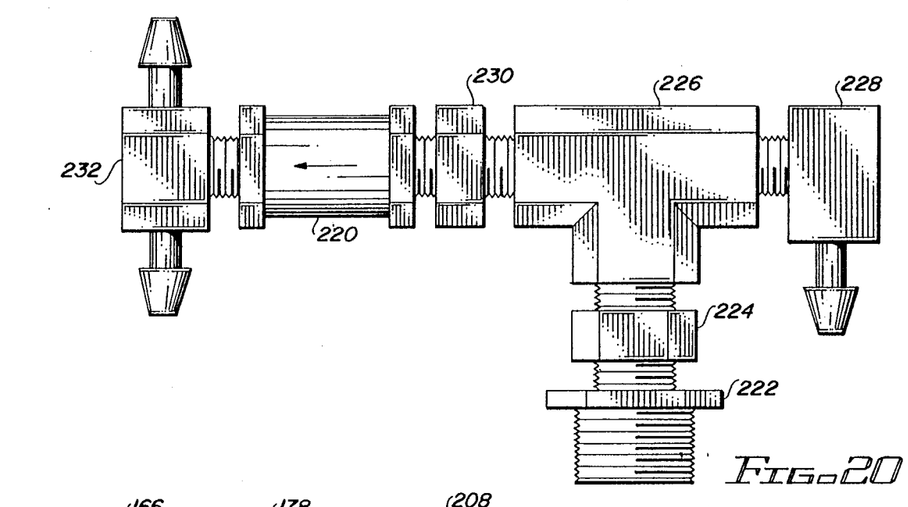
FIG. 20 is a plan view of the spring relief valve and various fittings for connection to the heater tube assembly manifold.

Referring next to FIG. 20, a spring relief valve 220 and various fittings for connection to the manifold 144 are illustrated. A fitting 222 having a male end and a female end with fluid communication therebetween has its male end screwed into the large boss 152 (FIG. 9) on the manifold 144. A fitting 224 having two male ends with fluid communication therebetween has one of them screwed into the female end of the fitting 222. A tee fitting 226 having three female ends with fluid communication therebetween has the female end which is the base of the tee fitting 226 screwed onto the other female end of the fitting 224.

An angle fitting 228 having a male end and a flared connector for attachment to a segment of tubing (not shown) with fluid communication therebetween has its male end screwed into one of the remaining female ends of the tee fitting 226. A fitting 230 having two male ends with fluid communication therebetween has one of them screwed into the remaining female end of the tee fitting 226. The fitting 222, the fitting 224, the tee fitting 226, the angle fitting 228, and the fitting 230 are all standard fittings.

The spring relief valve 220 will allow one-way flow therethrough in the direction of the arrow when the pressure across the spring relief valve 220 reaches 65 PSI. Until and unless the pressure reaches this level, however, the spring relief valve 220 will not allow fluid to pass therethrough. The spring relief valve 220 has female ends on both sides thereof, with the female end at which flow originates being screwed onto the available male end of the fitting 230. It will thus be appreciated that the spring relief valve 220 will open only when the pressure in the manifold 144 reaches an unsafe level indicative of a blockage somewhere in the system. Completing the assembly shown in FIG. 20 is a tee fitting 232 having a male end as the base thereof and two flared connectors for attachment to segments of tubing (not shown) with fluid communication therebetween has the male end screwed onto the other female end of the spring relief valve 220.

Referring now to FIG. 4, the installation of the heater tube assembly 120 and the various fittings described above into the aircraft coffee maker 30 may be described. It should be noted that the bracket 134 and the bracket 136 have, on the left side thereof (not shown), threaded apertures for receiving screws. Accordingly, when the heater tube assembly 120 is placed in the aircraft coffee maker 30 as shown in FIG. 4, two screws 234 (best shown in FIG. 3) are inserted into the threaded apertures (not shown) in the left side of the bracket 134 and the bracket 136 to hold the heater tube assembly 120 in place, anchored to the left side of the left housing half 32.

On the back of the aircraft coffee maker 30, the connections for water and power are made to the aircraft coffee maker 30. On the rear side of the left housing half 32, near the left and bottom thereof, a male quick disconnect fitting 236 of standard design is located. The male quick disconnect fitting 236 may be connected to a mating female fitting (not shown) to supply water, under pressure, to the aircraft coffee maker 30 from the aircraft's drinking water supply. On the rear side of the right housing half 34, near the right and bottom thereof, a male power connector 238 is located. The male power connector 238 is used to supply power to the aircraft coffee maker 30 from the aircraft, and is of standard design.

The location and configuration of the various segments of high temperature plastic tubing may now be discussed. A segment of tubing 240 is connected at one end thereof to the male quick disconnect fitting 236, and at the other end thereof to the angle fitting 206 (FIG. 18), which is screwed into the boss 138 (FIG. 9). A segment of tubing 242 is connected at one end thereof to the flared connector of the fitting 212, which is the outlet of the air vent valve 208. The other end of the segment of tubing 242 is connected to one flared connector of the tee fitting 232.

A tee fitting 244 having a male end as the base thereof and two flared connectors for attachment to segments of tubing with fluid communication therebetween has the male end screwed into the threaded aperture 114 (FIG. 5) of the brew nozzle 112. A segment of tubing 246 is connected at one end thereof to the remaining flared connector of the tee fitting 232, and at the other end thereof to one flared connector of the tee fitting 244.

An electrically operated solenoid valve 248 is also mounted onto the left wall of the left housing half 32 using two screws 250 (FIG. 3). The solenoid valve 248 has two flared connectors for attachment to segments of tubing. A segment of tubing 252 is connected at one end thereof to the flared connector of the angle fitting 228, and at the other end thereof to one of the flared connectors of the solenoid valve 248. A segment of tubing 254 is connected at one end thereof to the other flared connector of the solenoid valve 248, and at the other end thereof to the remaining flared connector of the tee fitting 244.

By way of incidental detail, it should be noted that the electronics are contained in a box 256 mounted in the back of the aircraft coffee maker 30 by four screws 258, two of which are shown in FIG. 3. Mounted onto the back of the box 256 is a heat sink 260, which is used to cool the electronics contained in the box 256. The functional description of the operation of the aircraft coffee maker 30 contained herein is sufficient to allow one skilled in the art to construct the electronics in any of a wide variety of manners.

The operation of the aircraft coffee maker 30 in brewing a server 44 of coffee may now be described. It is assumed that the aircraft coffee maker 30 is properly installed in the coffee maker bay (not shown) of an aircraft, that water under pressure is supplied to the male quick disconnect fitting 236, and that power is supplied to the male power connector 238. The air vent valve 208 will operate to prime the system, allowing all air out of the heater tube assembly 120. Air exiting the manifold 144 through the air vent valve 208 will pass through the segment of tubing 242, the tee fitting 232, the segment of tubing 246, and the tee fitting 244 into the brew nozzle 112, from which it is vented.

The server 44 is placed in the bay 43, with the left and right lower electrodes 96 and 102 depending into the server 44, as shown in FIG. 2. Coffee (not shown) and a filter (not shown) are placed in the brew tray 66, and the brew tray 66 is placed in the top of the bay 43 as shown in FIG. 1. The power switch 104 is pushed to turn power to the aircraft coffee maker 30 on, and the brew switch 106 is pushed to start brewing the coffee.

At this point, the heating elements 158 (FIG. 14) are energized, and the solenoid valve 248 (FIG. 248) is opened to initiate the flow of water through the system. It is possible to immediately start to flow water through the heater tube assembly 120 (FIG. 9) since the heating elements 158 will heat the heater tube assembly 120 virtually immediately. There is a very small volume of water in the heater tube assembly 120 (approximately seven ounces), so it is possible for the three heating elements 158, which together have a 2700 Watt heating capacity, to quickly heat the water.

Figure 21:
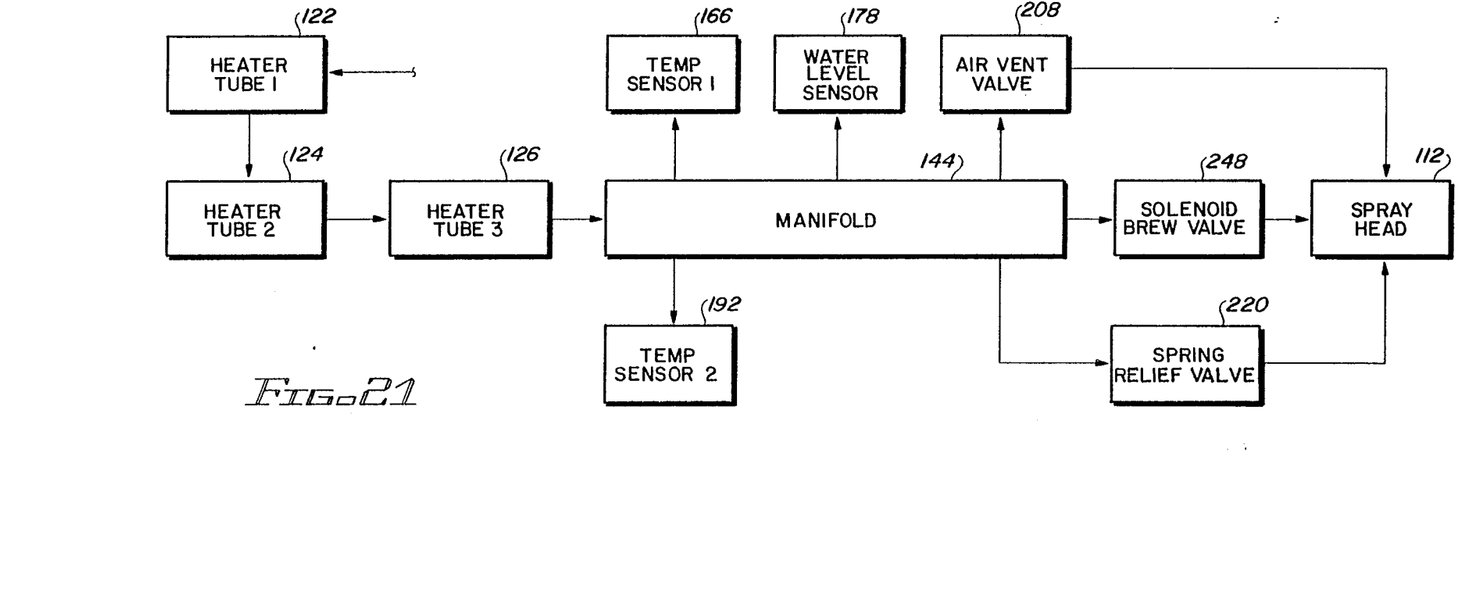
FIG. 21 is a flow chart showing the water path through the aircraft coffee maker of the present invention, and the infrastructure of the various safety systems.

Referring now to the flow chart of FIG. 21 and FIG. 4, as well as the other figures, the water is under pressure from the water line as it enters the male quick disconnect fitting 236, and flows through the segment of tubing 240 and the angle fitting 206 into the bottom of the first heater tube 122. Water flows around the heating element 158 in the first heater tube 122, and out the first heater tube 122 at the top through the connection tube 140 into the top of the second heater tube 124. The water then flows around the heating element 158 in the second heater tube 124 and out the second heater tube 124 at the bottom through the connection tube 142. Then the water flows around the heating element 158 in the third heater tube 126 and out the third heater tube 126 at the top into the manifold 144.

During the entire brew operation, three safety operations are being monitored. First, the water level sensor 178 operates to ensure that water in indeed contained in the heater tube assembly 120. If the water level sensor 178 determines that there is no water present, the system is immediately shut down, since this is a condition which should never occur. Secondly, the thermocouple 166 operates to control the temperature in the heater tube assembly 120. If the temperature gets above the set point, the thermocouple 166 will operate to turn the heating elements 158 off until the temperature returns to a temperature at or below the set rate.

Third, the thermocouple 192 operates as a redundant system to monitor the temperature in the heater tube assembly 120. If the temperature gets to a level above the level at which the thermocouple 166 should have cut power to the heating elements 158, the thermocouple 192 will shut the system down because of an indicated failure in operation of the thermocouple 166. It may thus be appreciated that the aircraft coffee maker 30 of the present invention is a highly safe apparatus, containing a water level sensor and two temperature sensors which may shut the system down in the event of a problem.

The remainder of the normal flow path may now be discussed, taking the hot water from the manifold 144 to the brew nozzle 112. When the solenoid valve 248 is opened, hot water flows out of the manifold 144 through the fitting 222, the fitting 224, the tee fitting 226, and the angle fitting 228 to the segment of tubing 252. From the segment of tubing 252 the hot water flows into and through the solenoid valve 248 to the segment of tubing 254. The hot water flows through the segment of tubing 254 and the tee fitting 244 to the brew nozzle 112, where it is sprayed on the coffee contained in the brew tray 66.

As mentioned above, the aircraft coffee maker 30 of the present invention contains the spring relief valve 220 to provide an alternate or bypass flow path for heated water in the event of a high pressure situation occurring for any reason. Such a situation may occur with a plugged fluid line in the segment of tubing 252, in the solenoid valve 248, or in the segment of tubing 254. In the event pressure in the heater tube assembly 120 rises above the preset 65 PSI of the spring relief valve 220, it will open to allow hot water to flow therethrough, and through the segment of tubing 246 to the brew nozzle 112. It is noteworthy that the 65 PSI setting of the spring relief valve 220 is considerably below the rated pressure of the heater tube assembly 120. It may thus be appreciated that the aircraft coffee maker 30 of the present invention is safeguarded against the buildup of excessive pressure in the system.

When sufficient water has been heated and sprayed through the brew nozzle 112 to fill the server 44 to the point where the left lower electrode 96 and the right lower electrode 102 are immersed, making contact therebetween, the brew cycle is complete. At this point, the solenoid valve 248 is closed to stop the flow of water through the system, and the heating elements 158 are turned off. The light in the brew switch 106 will turn off to indicate that the brew cycle is over and that the server 44 is full. The circular heating element 52, which came on when the power switch 104 was turned on, will remain on until the power switch 104 is turned off to keep coffee in the server 44 hot.

The aircraft coffee maker 30 of the present invention presents the advantage of speeding up the brewing process considerably, making a 48 ounce server 44 of coffee in three and one-half minutes from start to finish. Passing the water in a steady stream through the heater tube assembly 120 to heat the water heats it substantially faster than is possible in existing aircraft coffee maker designs, which typically take from seven to seven and one-half minutes to brew a 36 ounce pot. It will thus be appreciated that it takes approximately half the time to brew a larger server 44 of coffee with the aircraft coffee maker 30 of the present invention.

The coffee brewing process is also automated to the maximum extent possible, requiring but a single button to be pushed to perform the entire cycle. It may be appreciated that the aircraft coffee maker 30 of the present invention is easy to operate, and uses only a single valve rather than up to three valves as in existing aircraft coffee makers. Even the operation of the single valve is automatic, unlike the manual valve actuation required by existing coffee makers.

It will thus be appreciated from the detailed description of the preferred embodiment contained above that the aircraft coffee maker 30 of the present invention fits securely in a standard aircraft coffee maker bay. It operates on standard aircraft power, and automates the coffee brewing process to the maximum extent possible. The aircraft coffee maker 30 of the present invention eliminates approximately four pounds, resulting in substantial and valuable fuel savings.

The aircraft coffee maker 30 of the present invention also speeds up the brewing process substantially, requiring only half the time to brew a larger server 44 than previously known aircraft coffee makers. It also provides backup safety monitoring of a possible overheating situation, provides an alternate flow path for heated water in the event of a high pressure situation occurring for any reason. It will be appreciated by those skilled in the art that the improved aircraft coffee maker 44 of the present invention is easy to operate, and will thus be very desirable to galley crew personnel. It is also easy and inexpensive to manufacture, thereby giving it an economic advantage against competing designs. Finally, the present invention provides all of the aforesaid advantages and objectives without resulting in any significant disadvantage.

Although an exemplary embodiment of the present invention has been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. A device for brewing coffee or the like in an aircraft, comprising:
   a housing;
   a container for holding fluid, said container being received by said housing in a position for receiving brewed coffee or the like;
   a brew tray for holding coffee or the like, said brew tray being received in said housing in a position above said container when said container is in a position for receiving brewed coffee or the like, said brew tray having at least one perforation at the bottom thereof through which brewed coffee or the like may drain from said brew tray into said container;
   a brew nozzle mounted in said housing above said brew tray when said brew tray is received in said housing, said brew nozzle for spraying hot water received by said brew nozzle into said brew tray onto coffee or the like;
   means for heating water, said heating means having an inlet end and an outlet end, said inlet end of said heating means being for connection to a supply of water under pressure from a source external to said device; and
   an electrically operated solenoid valve located between said outlet end of said heating means and said brew nozzle, hot water being supplied to said brew nozzle from said heating means when said electrically operated solenoid valve is in an open position.

2. A device as defined in claim 1, wherein said housing comprises:
   a left housing half which is molded of high impact material; and
   a right housing half which is molded of high impact material, said left and right housing halves being fastened together to form said housing.

3. A device as defined in claim 1, wherein said container comprises:
   a server having a handle, said server having a neck located at the top thereof into which hot coffee or the like is drained from said brew tray, and from which hot coffee or the like may be poured.

4. A device as defined in claim 3, additionally comprising:
   means for retaining said server in said housing in position for receiving hot coffee or the like.

5. A device as defined in claim 1, wherein said brew nozzle has a small chamber contained therein, said small chamber being in fluid communication with a plurality of spray channels directed into said brew tray to evenly disperse hot water or coffee or the like contained in said brew tray.

6. A device as defined in claim 5 wherein there are three spray channels in said brew nozzle, said three spray channels leading from a common centrally located origin radially outwardly at an angle approximately ten degrees from vertical, said three spray channels being radially approximately 120 degrees apart.

7. A device as defined in claim 1, wherein said heating means comprises:
   a first heater tube having a first end and a second end, said first end of said first heater tube being said inlet end of said heating means;
   a first heating element located in said first heater tube;
   a second heater tube having a first end and a second end, said second end of said first heater tube being in fluid communication with first end of said second heater tube;
   a second heating element located in said second heater tube;
   a third heater tube having a first end and a second end, said second end of said second heater tube being in fluid communication with first end of said third heater tube; and
   a third heating element located in said third heater tube.

8. A device as defined in claim 7, wherein said first, second, and third heating elements are connected in wye fashion to run on 208 Volt, 400 Hertz three phase power.

9. A device as defined in claim 7, additionally comprising:
   a manifold defining a chamber therein, said second end of said third heating element being in fluid communication with said chamber in said manifold.

10. A device as defined in claim 9, wherein said first, second, and third heater tubes are located consecutively adjacent each other, with said second ends of said first and third heater tubes and said first end of said second heater tube being adjacent said manifold.

11. A device as defined in claim 9, wherein an opening in said manifold is said outlet end of said heating means.

12. A device as defined in claim 1, additionally comprising:
    an air vent valve for automatically venting air from said heating means.

13. A device as defined in claim 1, additionally comprising:
    a first temperature sensor for shutting down said heating means if the temperature in said heating means exceeds a first preset level.

14. A device as defined in claim 13, wherein said first preset level is between approximately 190 degrees Fahrenheit and 196 degrees Fahrenheit.

15. A device for brewing coffee or the like in an aircraft, comprising:

a housing;

a container for holding fluid, said container being received by said housing in a position for receiving brewed coffee or the like;

a brew tray for holding coffee or the like, said brew tray being received in said housing in a position above said container when said container is in a position for receiving brewed coffee or the like, said brew tray having at least one perforation at the bottom thereof through which brewed coffee or the like may drain from said brew tray into said container;

a brew nozzle mounted in said housing above said brew tray when said brew tray is received in said housing, said brew nozzle for spraying hot water received by said brew nozzle into said brew tray onto coffee or the like;

a first heater tube having a first end and a second end, said first end of said first heater tube being for connection to a supply of water under pressure from a source external to said device;

a first heating element located in said first heater tube;

a second heater tube having a first end and a second end, said second end of said first heater tube being in fluid communication with first end of said second heater tube;

a second heating element located in said second heater tube;

a third heater tube having a first end and a second end, said second end of said second heater tube being in fluid communication with first end of said third heater tube;

a third heating element located in said third heater tube;

a manifold defining a chamber therein, said second end of said third heating element being in fluid communication with said chamber in said manifold, said manifold having an outlet located therein; and a valve located between said outlet in said manifold and said brew nozzle, hot water being supplied to said brew nozzle from said manifold when said valve is in an open position.

16. A device for brewing coffee or the like in an aircraft, comprising:

a housing;

a container for holding fluid;

a brew tray for holding coffee or the like, said brew tray for diverting brewed coffee contained therein into said container;

a brew nozzle mounted in said housing above said brew tray, said brew nozzle for spraying hot water onto coffee or the like;

means for heating water, said heating means having an inlet end and an outlet end, said heating means being sealed and open only at said inlet end and said outlet end, said inlet end of said heating means for direct connection to a supply of water under pressure from a source external to said device; and an electrically operated solenoid valve located between said outlet end of said heating means and said brew nozzle for supplying hot water to said brew nozzle from said heating means when said electrically operated solenoid valve is in an open position.

17. A device for brewing coffee or the like in an aircraft, comprising:

a housing;

a server for holding fluid therein, said server having a handle, said server having a neck located at the top thereof into which hot coffee or the like may flow and from which hot coffee or the like may be poured, said server being received by said housing in a position for receiving brewed coffee or the like;

an arm moveably mounted about an axis fixed with respect to said housing, said arm having a first position in which it extends toward the back of said housing at a downward angle and a second position in which it is located horizontally with respect to said housing;

a trigger portion located at the front of said arm, which trigger portion may be pressed downwardly to move said arm from said first position to said second position, said arm extending into said neck of said server when said server is in position for receiving hot coffee or the like to retain said server in said housing in position for receiving hot coffee or the like until said trigger portion is pressed downwardly;

a brew tray for holding coffee or the like, said brew tray being received in said housing in a position above said server when said server is in a position for receiving brewed coffee or the like, said brew tray having at least one perforation at the bottom thereof through which brewed coffee or the like may drain from said brew tray through said neck of said server into said server;

a brew nozzle mounted in said housing above said brew tray when said brew tray is received in said housing, said brew nozzle for spraying hot water received by said brew nozzle into said brew tray onto coffee or the like;

means for heating water, said heating means having an inlet end and an outlet end, said inlet end of said heating means being for connection to a supply of water under pressure from a source external to said device; and a valve located between said outlet end of said heating means and said brew nozzle, hot water being supplied to said brew nozzle from said heating means when said valve is in an open position.

18. A device for brewing coffee or the like in an aircraft, comprising:

a housing;

a server for holding fluid therein, said server having a handle, said server having a neck located at the top thereof into which hot coffee or the like may flow and from which hot coffee or the like may be poured, said server being received by said housing in a position for receiving brewed coffee or the like;

a first electrode made of conductive material and extending through said neck of said server at least partially into said server when said server is received by said housing in a position for receiving brewed coffee or the like;

a second electrode made of conductive material and also extending through said neck of said server at least partially into said server when said server is received by said housing in a position for receiving brewed coffee or the like, said second electrode being spaced away from said first electrode, said first and second electrodes being sufficiently long so that they will contact coffee or the like in said server when said server is full, thereby becoming electrically connected to provide a signal indicative of the fact that said server is full;
a brew tray for holding coffee or the like, said brew tray being received in said housing in a position above said server when said server is in a position for receiving brewed coffee or the like, said brew tray having at least one perforation at the bottom thereof through which brewed coffee or the like may drain from said brew tray through said neck of said server into said server;
a brew nozzle mounted in said housing above said brew tray when said brew tray is received in said housing, said brew nozzle for spraying hot water received by said brew nozzle into said brew tray onto coffee or the like;
means for heating water, said heating means having an inlet end and an outlet end, said inlet end of said heating means being for connection to a supply of water under pressure from a source external to said device; and
a valve located between said outlet end of said heating means and said brew nozzle, hot water being supplied to said brew nozzle from said heating means when said valve is in an open position.

19. A device as defined in claim 18, additionally comprising:
first support means depending from said housing; and
second support means depending from said housing, said first and second support means being electrically insulated from each other;
wherein said first electrode comprises:
a first upper electrode suspended in swingably moveable fashion from said first support means; and
a first lower electrode suspended in swingably moveable fashion from said first upper electrode; and
wherein said second electrode comprises:
a second upper electrode suspended in swingably moveable fashion from said second support means; and
a second lower electrode suspended in swingably moveable fashion from said second upper electrode.

20. A device as defined in claim 9, wherein the relative lengths of said first and second upper electrodes and said first and second lower electrodes are sufficiently short to cause them to fall into said neck of said server when said server is placed in position for receiving brewed coffee or the like, yet sufficiently long to allow said first and second lower electrodes to contact coffee or the like in said server when said server is full.

21. A device for brewing coffee or the like in an aircraft, comprising:
a housing;
a container for holding fluid, said container being received by said housing in a position for receiving brewed coffee or the like;
a brew tray for holding coffee or the like, said brew tray being received in said housing in a position above said container when said container is in a position for receiving brewed coffee or the like, said brew tray having at least one perforation at the bottom thereof through which brewed coffee or the like may drain from said brew tray into said container;
a brew nozzle mounted in said housing above said brew tray when said brew tray is received in said housing, said brew nozzle for spraying hot water received by said brew nozzle into said brew tray onto coffee or the like;
means for heating water, said heating means having an inlet end and an outlet end, said inlet end of said heating means being for connection to a supply of water under pressure from a source external to said device;
a valve located between said outlet end of said heating means and said brew nozzle, hot water being supplied to said brew nozzle from said heating means when said valve is in an open position; and
a relief valve for providing an alternate route between said outlet end of said heating means and said brew nozzle if the pressure in said heating means exceeds a preset level.

22. A device for brewing coffee or the like in an aircraft, comprising:
a housing;
a container for holding fluid, said container being received by said housing in a position for receiving brewed coffee or the like;
a brew tray for holding coffee or the like, said brew tray being received in said housing in a position above said container when said container is in a position for receiving brewed coffee or the like, said brew tray having at least one perforation at the bottom thereof through which brewed coffee or the like may drain from said brew tray into said container;
a brew nozzle mounted in said housing above said brew tray when said brew tray is received in said housing, said brew nozzle for spraying hot water received by said brew nozzle into said brew tray onto coffee or the like;
means for heating water, said heating means having an inlet end and an outlet end, said inlet end of said heating means being for connection to a supply of water under pressure from a source external to said device;
a valve located between said outlet end of said heating means and said brew nozzle, hot water being supplied to said brew nozzle from said heating means when said valve is in an open position;
a first temperature sensor for shutting down said heating means if the temperature in said heating means exceeds a first preset level; and
a second temperature sensor for shutting down said heating means if the temperature in said heating means exceeds a second preset level higher than said first preset level.

* * * * *